UNITED STATES PATENT OFFICE.

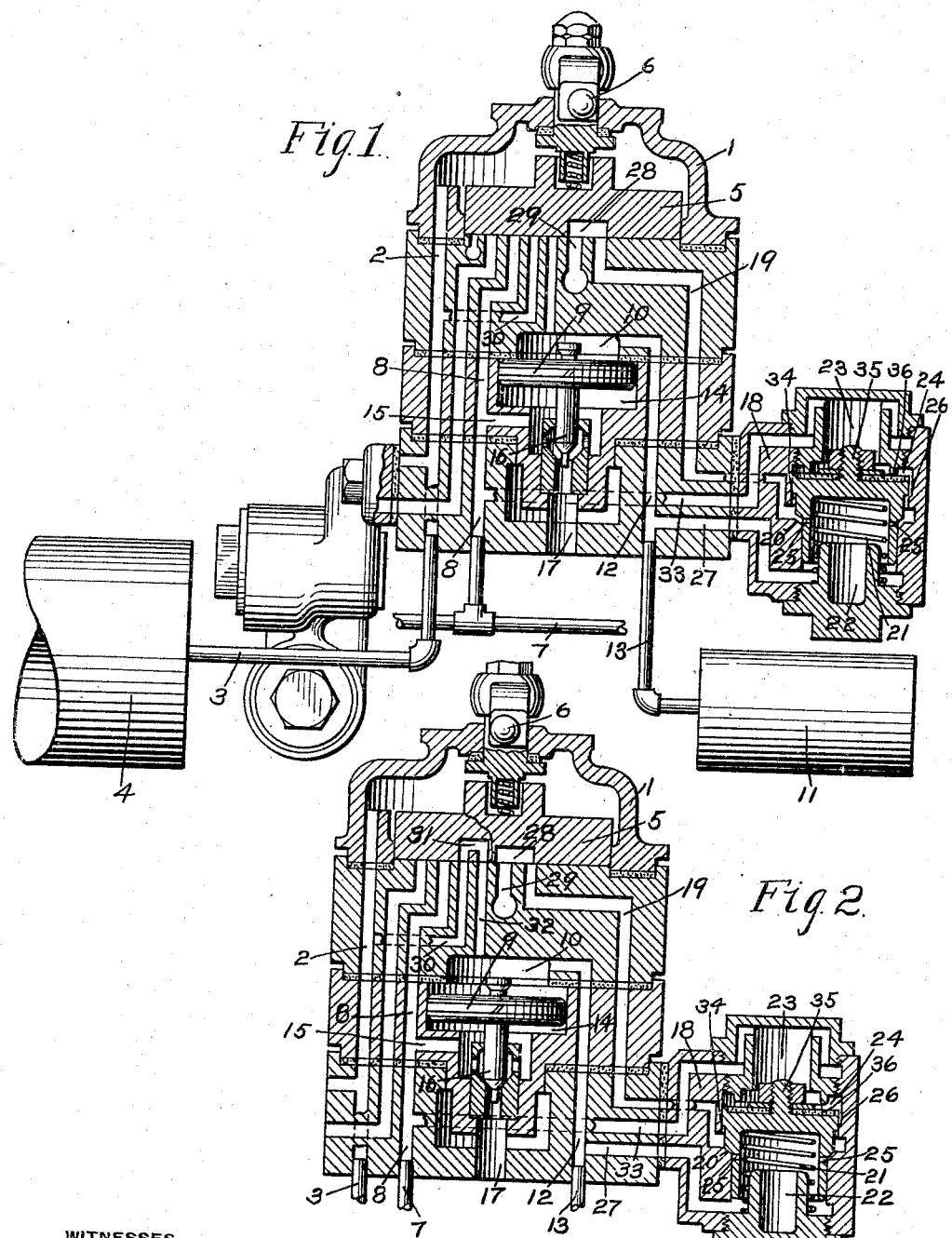

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ENGINEER'S BRAKE-VALVE.

1,228,500. Specification of Letters Patent. Patented June 5, 1917.

Application filed July 13, 1915. Serial No. 39,567.

*To all whom it may concern:*

Be it known that I, WALTER V. TURNER, a citizen of the United States, residing at Edgewood, in the county of Allegheny and State of Pennsylvania, have invented new and useful Improvements in Engineers' Brake-Valves, of which the following is a specification.

This invention relates to fluid pressure brakes, and more particularly to a brake valve device for controlling the brakes where brake applications are effected by reducing the brake pipe pressure.

It is a well known fact that long trains can be handled more smoothly by means of a graduated rather than a continuous application of the brakes, since there is danger when a heavy continuous brake pipe reduction is made that the brakes will be applied at the head end of the train sufficiently in advance of those at the rear end as to cause the slack of the train to run in harshly and thus produce dangerous shocks and possibly a break-in-two on the recoil. The recommended practice for manipulating the brakes on a long train in order to overcome this difficulty, consists in first making an initial light brake pipe reduction, such as to insure that all the brakes on the train will apply, and then after moving the brake valve handle to lap position and holding the same there until the brake pipe exhaust ceases, to effect a heavier brake pipe reduction sufficient to produce the desired application of the brakes.

The engineer does not always follow this practice, and the principal object of the present invention is to provide means for automatically insuring that the operation will be as above described.

In the accompanying drawing; Figure 1 is a central sectional view of a brake valve device embodying my invention, with the parts shown in the positions they assume at the beginning of a service application; and Fig. 2 a similar view, with the parts in the positions assumed immediately after the brake valve handle is moved from service application position to lap position.

As shown in the drawing, the brake valve device may comprise a sectional casing 1 having the usual rotary valve chamber connected by passage 2 and pipe 3 with the main reservoir 4, and containing rotary valve 5, operated by the handle 6, the brake pipe 7 communicating with a passage 8 leading to the rotary valve seat.

The brake valve casing also contains the usual equalizing piston 9, subject on one side to the pressure in chamber 10, which is open to the equalizing reservoir 11 through passage 12 and pipe 13, and on the opposite side to the pressure in chamber 14, which is connected to the brake pipe 7 through passages 15 and 8.

The equalizing piston 9 operates the usual discharge valve 16 for controlling the venting of air from the brake pipe 7 to the atmosphere through the exhaust port 17.

According to my invention, there is provided a differential piston valve 35, adapted to control communication from the equalizing reservoir 11 to the rotary valve seat. Said piston is contained in a casing 18, which may be secured to the brake valve casing 1 as shown in the drawing, and is adapted to seal against a seat 36 in one position and against another seat 20 in its opposite position.

The piston valve 35 is subject on one side to the pressure of a coil spring 21 and a chamber 22, which is constantly open through a passage 27 and pipe 13 to the equalizing reservoir 11 and on the opposite side to brake pipe pressure supplied through passage 33, so that brake pipe pressure normally acts on a restricted area of the piston when said piston engages its seat 36, the full area of the piston being exposed to brake pipe pressure when the piston lifts from said seat.

In operation, the equalizing reservoir is charged with the brake pipe in the usual manner, and the piston valve 35 will be held on its brake pipe seat 36 by the tension of the spring 21, since the brake pipe and equalizing reservoir pressures are balanced. The annular space 24 at the upper end of the valve 35 is preferably connected to chamber 22 through groove 26 and ports 25, so as to insure that when the piston valve 35 is on its brake pipe seat 36, the pressures in chamber 24 will always be equal to that in chamber 22.

When the brake valve handle 6 is moved to service application position, as shown in Fig. 1 of the drawing, the preliminary exhaust port 29 is opened and the pressure in chamber 10 and the equalizing reservoir 11 is reduced, air flowing through passage 27, chamber 22, ports 25, passage 19, cavity 28 in rotary valve 5 and passage 29 in the seat, to the atmosphere.

The brake pipe pressure then lifts piston 9 and unseats the discharge valve 16 so that fluid is vented from the brake pipe 7 in the usual manner.

If the train is short and the brake pipe volume such that the pressure therein can reduce as fast as the pressure in the equalizing reservoir is reducing, through the preliminary exhaust port, then the piston valve 35 will remain seated on the brake pipe seat 36 as shown in Fig. 1 of the drawing, and the equalizing reservoir 11 remains connected to the preliminary exhaust port.

If, however, the train is long, the pressure in the equalizing reservoir 11 will reduce at a faster rate than the brake pipe pressure, and when a sufficient differential has been established on the piston valve 35, governed by the tension of the spring 21 and the area exposed to brake pipe pressure, the piston valve 35 will be shifted to its lower position against the seat 20. This movement will be quick and positive, since as soon as the valve starts away from its brake pipe seat 36, the whole area will be exposed to the higher brake pipe pressure.

In this position of the piston valve 35, ports 25 are closed, thus cutting off communication from chamber 22 to passage 19 and consequently from the equalizing reservoir 11 to the preliminary exhaust port 29, so that further venting of air from the equalizing reservoir is prevented. As soon as the pressure in chamber 14 has dropped a trifle below that in chamber 10, the equalizing piston 19 will be moved downwardly, and the equalizing discharge valve 16 will be seated, thus preventing the further exhaust of fluid from the brake pipe, so that the reduction is limited to a predetermined amount.

In order to prevent the operator from making a further reduction in brake pipe pressure before a certain time has elapsed, the piston valve 35 is arranged so as to re-open ports 25 only after the equalizing reservoir has been recharged a predetermined degree above that remaining in the brake pipe, the excess pressure in said reservoir then holding the discharge valve seated. This is preferably accomplished by providing an annular area 34 above seat 20, which may be connected to the atmosphere through passage 19, cavity 28 and passage 29, when the brake valve is in lap position, as shown in Fig. 2 of the drawing, thus producing a differential on the piston valve 35 to hold it to its seat 20.

The recharge of the equalizing reservoir may be affected when the brake pipe is in lap position, by connecting passages 30 and 32 by cavity 31 so that fluid flows from the main reservoir through said passages to chamber 10 and thence to the equalizing reservoir 11 and chamber 22.

When the equalizing reservoir has thus been recharged to the predetermined pressure, piston valve 35 will be shifted from its position on seat 20 to its brake pipe seat 19, in which position ports 25 are re-opened and communication again established from chamber 22 to passage 19, and consequently from the equalizing reservoir 11 to the preliminary exhaust port, and the venting of air through passage 29 will indicate to the operator that piston valve 35 has re-opened ports 25.

If the brake valve handle is now moved to service application position, and communication from passage 30 to passage 32 thereby cut off, the equalizing reservoir pressure will again start reducing, but due to said reservoir having been recharged to a higher pressure than that in the brake pipe this excess must be reduced before the equalizing piston 9 will respond. When the pressure in chamber 10 is slightly below that in chamber 14, the equalizing piston 9 will be lifted and the discharge valve 16 unseated, thus venting fluid from the brake pipe in the usual manner.

When the pressure in chamber 22 is again a predetermined amount below that in chamber 23, the piston valve 35 will be shifted from its seat 19 to seat 20, thus closing ports 25 and preventing the further reduction of equalizing reservoir pressure. The seating of the discharge valve 16 will then stop the further reduction of brake pipe pressure.

If it is desired to make another reduction in brake pipe pressure, the brake valve handle must be again moved to lap position and the equalizing reservoir recharged, as in the first instance above described.

This operation may be continued in cycles until the desired degree of brake pipe reduction has been made, it being evident that if the train is of such length that the brake pipe pressure cannot reduce as fast as the equalizing reservoir is reducing, the operator is compelled to make a graduated application of the brakes, and there is an enforced time element between the stopping of one reduction and the beginning of the next.

Having now described my invention, what

I claim as new and desire to secure by Letters Patent, is:—

1. In a fluid pressure brake, the combination with a brake pipe and a brake valve device having an equalizing discharge valve mechanism for controlling the discharge of fluid from the brake pipe, of means for preventing a second reduction in brake pipe pressure by manipulation of the brake valve until a predetermined time interval has elapsed.

2. In a fluid pressure brake, the combination with a brake pipe and a brake valve device having an equalizing discharge valve mechanism for controlling the discharge of fluid from the brake pipe, of means for insuring a predetermined time interval between successive reductions in brake pipe pressure as effected by manipulation of the brake valve.

3. In a fluid pressure brake, the combination with a brake pipe and a brake valve device having an equalizing discharge valve mechanism for controlling the discharge of fluid from the brake pipe, of means for limiting to a predetermined degree the reduction in brake pipe pressure which can be made at one time by manipulation of the brake valve and adapted to prevent a successive reduction in brake pipe pressure until a predetermined time interval has elapsed.

4. In a fluid pressure brake, the combination with a brake pipe and a brake valve device having an equalizing discharge valve mechanism for controlling the discharge of fluid from the brake pipe, of means for automatically regulating the operation of the equalizing discharge valve mechanism when the brake valve is successively operated, to produce predetermined reductions in brake pipe pressure at predetermined time intervals.

5. In a fluid pressure brake, the combination with a brake pipe and a brake valve device having an equalizing discharge valve mechanism subject to the opposing pressures of an equalizing reservoir and the brake pipe for controlling the discharge of fluid from the brake pipe, of a valve device subject to the opposing pressures of the brake pipe and the equalizing reservoir and adapted upon the equalizing reservoir pressure reducing at a greater rate than the brake pipe pressure to first cut off communication through which said pressure is reduced and then open said communication upon a predetermined increase in equalizing reservoir pressure.

6. In a fluid pressure brake, the combination with a brake pipe and a brake valve device having an equalizing discharge valve mechanism subject to the opposing pressures of an equalizing reservoir and the brake pipe for controlling the discharge of fluid from the brake pipe, of a valve device subject to the opposing pressures of the brake pipe and the equalizing reservoir and operated upon a reduction in equalizing reservoir pressure to a predetermined degree less than the brake pipe pressure for closing communication through which the brake valve device reduces the equalizing reservoir pressure and then operating to open said communication upon a predetermined increase in equalizing reservoir pressure, the brake valve device being adapted in lap position to supply fluid to the equalizing reservoir.

7. In a fluid pressure brake, the combination with a brake pipe and a brake valve device having an equalizing discharge valve mechanism subject to the opposing pressures of an equalizing reservoir and the brake pipe for controlling the discharge of fluid from the brake pipe, of a valve device subject to the opposing pressures of the brake pipe and the equalizing reservoir and operated upon a reduction in equalizing reservoir pressure to a predetermined degree less than the brake pipe pressure for closing communication through which the brake valve device reduces the equalizing reservoir pressure and then operating to open said communication upon a predetermined increase in equalizing reservoir pressure, the brake valve device being adapted in service position to vent fluid from the equalizing reservoir and in service lap position to supply fluid to the equalizing reservoir.

8. The combination with a brake valve device having an equalizing discharge valve mechanism subject to the opposing pressures of the brake pipe and an equalizing reservoir for controlling the discharge of fluid from the brake pipe in making an application of the brakes, of a valve device subject to the opposing pressures of the brake pipe and equalizing reservoir and operating when the equalizing reservoir pressure reduces faster than the brake pipe pressure for closing communication through which the equalizing reservoir pressure is reduced, said valve device having a differential area adapted to be subjected to atmospheric pressure for establishing a pressure differential on the brake pipe side of the valve device.

9. The combination with a brake valve device having an equalizing discharge valve mechanism subject to the opposing pressures of the brake pipe and an equalizing reservoir for controlling the discharge of fluid from the brake pipe in making an application of the brakes, of a valve device subject to the opposing pressures of the brake pipe and equalizing reservoir and operating when the equalizing reservoir pressure reduces faster than the brake pipe pressure for closing communication through which the equalizing reservoir pressure is reduced, said valve device having a differential area subjected to atmospheric pressure in the lap position of the brake valve, to create a differential pressure on the valve device tending to delay the opening of said communication.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."